Nov. 29, 1949 — R. W. PHILLIPS — 2,489,928

ADAPTER FOR DISSIMILAR FITTINGS

Filed Sept. 27, 1947

INVENTOR.
ROBERT W. PHILLIPS.
BY Richey & Watts
ATTORNEYS.

Patented Nov. 29, 1949

2,489,928

UNITED STATES PATENT OFFICE 2,489,928

ADAPTER FOR DISSIMILAR FITTINGS

Robert W. Phillips, University Heights, Ohio, assignor to The Weatherhead Company, Cleveland, Ohio, a corporation of Ohio Application September 27, 1947, Serial No. 776,585

2 Claims. (Cl. 285—86)

This invention relates broadly to fittings for pipes and tubing, and more specifically to the provision of an adapter device which makes it possible to connect a piece of tubing to a fitting or to connect two fittings together wherein the parts to be connected are not manufactured to be used in conjunction with one another.

This invention is generally related to the device disclosed in application Serial No. 655,743 of Norbert C. Beerli, filed March 20, 1946, and assigned to The Weatherhead Company, Cleveland, Ohio; but this invention discloses a fitting having a different mode of operation from that embodied in the aforesaid application.

Recent developments in the fitting art have resulted in the introduction and general adoption of several different types of fittings, all of which are designed to serve the same general purpose. For example, one type of commonly encountered fitting includes a male nipple terminating in a portion with an external conical surface designed to receive a conically flared tube, or to cooperate with a conically flared sleeve on which is mounted a flexible hose. Another type of widely used fitting has a body portion which includes a male nipple formed with a relatively shallow concave conical surface at the end of the nipple, but in this type of fitting the internal conical surface is an internal surface designed to receive a tube clamping or a cutting ring that is compressed about the tube by the fitting to grip and retain the tube member. Thus, it has been impossible to connect a female portion of the first named fitting, which portion includes an internal conical surface to the male portion of the second named fitting, which male portion also terminates in an internal conical surface, a situation that makes field service and changeovers costly and time consuming. This has resulted in considerable inconvenience and loss of time to manufacturers and to service personnel charged with the responsibility of making up and maintaining hydraulic systems, it being common to find one unit built up with one type fittings and the other unit made with the other type of fittings, there being no means to make a connection between them without replacing one of the fittings.

The aforesaid application of Norbert C. Beerli discloses such a device and it is likewise an object of this invention to make it possible to connect two such dissimilar fittings by providing a simple adapter device which will not only permit such a connection but which will give a dependable and fluid-tight seal.

It is a further object of this invention to produce a fitting that may be coupled and uncoupled numerous times using a high tightening torque, without danger of mutilating either the adapter or the fittings.

It is another object of this invention to provide an adapter which produces a seal between two shallow tapered surfaces but which can be readily machined and which need not be held to close tolerances so that even if said shallow tapered surfaces do not provide a perfect seal, other means come into play to produce a fluid-tight seal.

Other objects and advantages of this invention will become apparent as the following description proceeds.

Figure 1:
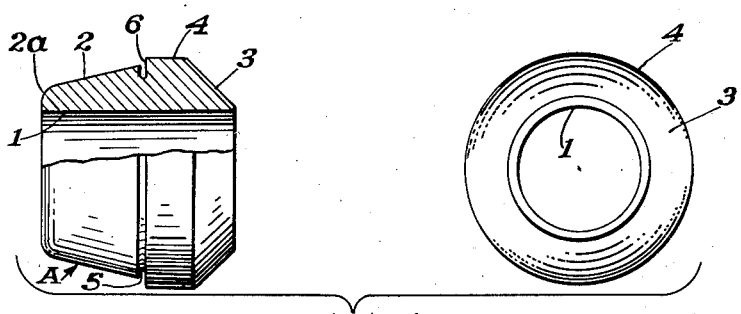
Fig. 1 is an external view of an adapter made in accordance with my invention.

Referring now to the drawings, Fig. 1 shows my adapter A which is axially apertured at 1 and which is generally in the form of a double cone. I form two conical or tapered surfaces 2 and 3 externally of the adapter for mating with the parts to be connected. The larger diameter portion 4 of the adapter preferably has a cylindrical peripheral edge that is separated by groove 5 from tapered surface 2. In this manner a radial face 6 is provided for purposes to be hereinafter described. I may round the forward nose of the adapter as at 2a, to facilitate assembly of the fitting.

Figure 2:
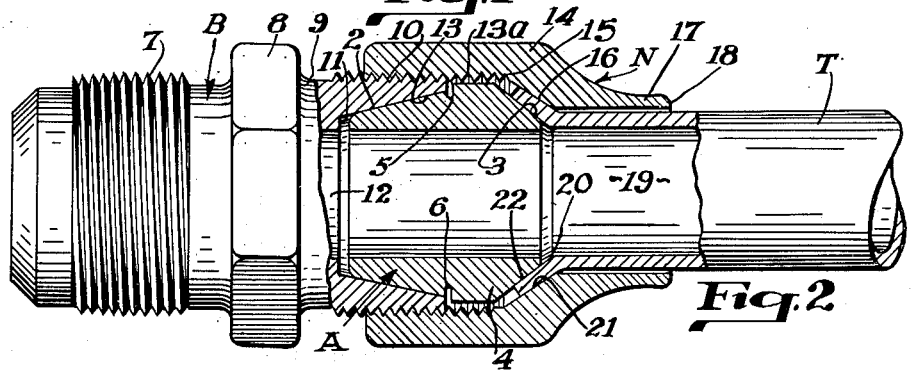
Fig. 2 is a cross-sectional view showing how my adapter is used to permit the assembly of flared tube fitting and a nipple designed for another type of fitting.

Fig. 2 shows the adapter used to connect a flared tube to a fitting having a nipple not designed to receive a flared tube. The assembly includes the adapter A, the fitting body B, attaching nut N and a flared tube T. The nipple B has a threaded portion 7 for attaching it to the rest of the system although the means for attaching nipple B forms no part of this invention. Nipple B may also include a polygonal section 8 to receive a wrench and it is formed with an axially extending nipple portion 9 which is provided with external threads at 10. Nipple portion 9 of body B has a fluid conducting bore 12. The terminal portion of nipple 9 has an internal conical surface 13 of relatively shallow taper which is designed to receive a male tube cutting or gripping sleeve used in conjunction with certain types of fittings well-known to the art. However, it is desired to use body B with another well-known type of fitting which does not include a tube cutting or gripping sleeve member that cooperates with conical surface 13 to retain a tube. One common type of such a fitting includes a nut N with a sleeve portion 14 which is internally threaded as at 15 and which portion is formed with an internal conical surface 16. In the form shown in Fig. 2, nut N has a shank portion 17 apertured as at 18 to receive the tube T. Tube T has a fluid passageway 19 and a terminal flared conical portion 20, which conical portion has an outer conical surface 21 and an inner conical surface 22. When the nut N is tightened, the inner conical surface 16 of the nut is forced against the outer conical surface 21 of the flared tube. This presses the flared tube against the adapter A so that the inner conical surface 22 of the flared tube is forced against the outer conical surface 3 of the adapter, the vertex angles of these conical surfaces being substantially equal after tightening. This action, in turn, forces the adapter against the nipple B so that the shallow conical surface 2 of the adapter makes a tight engagement with the corresponding internal conical surface 13 in the nipple, so that a good fluid seal is had with both fittings. The diameter of the peripheral portion 4 of the adapter is such that a free fit is obtained in the threaded chamber in the nut.

In fittings of the type to which this invention relates, the tapered surface 13 in fitting B is generally quite shallow to provide a powerful radial compression of the cutting ring for which it is designed. Thus, if excessive torque is employed in setting up the fitting the nipple portion 9 of body B will stretch and this might result in binding of nut N. However, excessive stretching of nipple 9 is prevented because radial wall 6 of the adapter engages end wall 13a of body B to prevent further splaying of the nipple 9 and augment the seal. This construction has another advantage in that if the fit between nipple 9 and the conical surface 2 of the adapter is somewhat loose, the radial wall 6 will abut the nipple wall as described and provide a good seal. This permits a somewhat greater tolerance in manufacture than could otherwise be allowed without lengthening the engaging nipple and adapter parts. Since conical surface 3 of the nipple has a steep vertex angle, there is little danger of spreading the nut N excessively.

Figure 3:
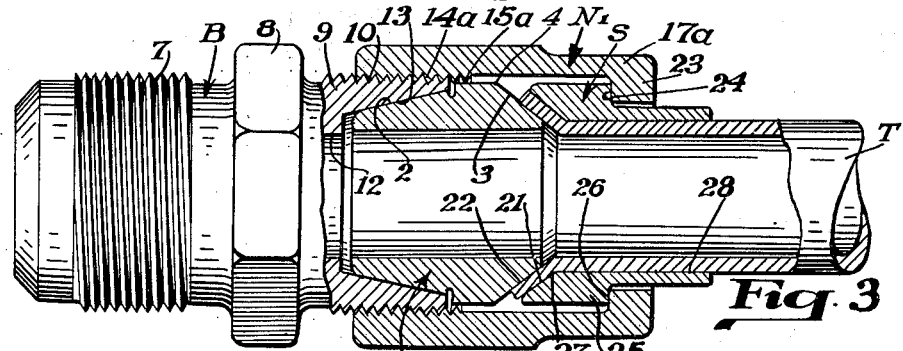
Fig. 3 is a cross-sectional view of my adapter used to connect the flared tube to a fitting not designed to receive the tube, the arrangement being generally like that shown in Fig. 2 except that a separate sleeve is formed and placed against the conical portion of the tube.

Referring to Fig. 3, my adapter is shown mounting a flared tube to the same nipple shown in Fig. 2, the only difference being that the attaching nut $N_1$ acts upon a separately formed sleeve S. Except for the modification of the attaching nut and the additional sleeve the assembly is like that shown in Fig. 2. Attaching nut $N_1$ has a threaded portion 14a and internal threads 15a which engage threads 10 on nipple B. The end portion 17a of the nut is formed with a lip portion 23 which has an internal abutment surface 24. Sleeve S is apertured to receive the tube T and has a body portion 25 which has formed thereon an abutment portion 26 which is acted upon by the abutment 24 of the nut. The reduced portion 28 extends through the nut and along the tube for an appreciable distance. Sleeve S has an outwardly flaring conical surface 27 of the same shape as that of the surface 16 in Fig. 2 and the tube T is formed with an outwardly flaring portion having conical surfaces 21 and 22 like those shown in Fig. 2. When nut $N_1$ is tightened in this modification, the sleeve forces the tube against the adapter which, in turn, forces the adapter against the nipple B and the action is like that described in connection with Fig. 2.

Figure 4:
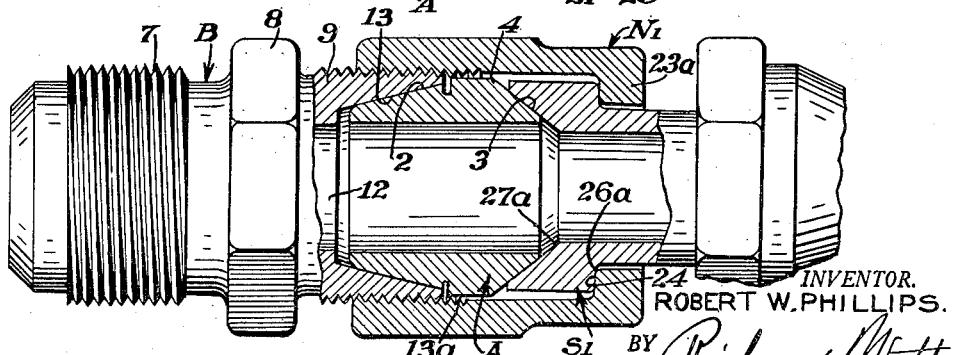
Fig. 4 is a cross-sectional view of my adapter used with a flared sleeve fitting carrying a flexible hose.

Fig. 4 shows my adapter employed to attach a hose end to the nipple B. Here the only difference lies in the extension of the sleeve $S_1$ to receive a hose connection.

The sleeve $S_1$ like sleeve S in Fig. 3 has a body portion 23a formed with an abutment 26a to receive the abutment 24 on the nut $N_1$. Sleeve $S_1$ has an outwardly flaring conical surface 27a which corresponds to the conical surface 3 on the adapter A. Surface 27a is made in accordance with the conventional flared type design. When the nut $N_1$ is tightened, sleeve $S_1$ is forced against the adapter and the action is like that described previously.

Having completed the description of my invention, it can be seen how my adapter permits connection of a pair of dissimilar fittings and how it will produce a good seal. With this arrangement field personnel and others will be able to do service work and make up jobs with existing equipment, which might otherwise require either complete new fitting installations or the ordering of additional parts. Also, the engagement between the conical surfaces of the adapter and those of the fittings produces an effective joint that can be detached many times and retightened with high torques without mutilation of the parts.

Various modifications can be made in my device without departing from the spirit of the invention. Although the internal diameter of the aperture in the adapter can be varied also, the external conical surfaces 2 and 3 should be made to substantially conform to the type of fitting with which it is to work. However, I contemplate that these surfaces could be slightly rounded or elliptical without departing from the described mode of operation. The adapter may be made of a relatively soft or deformable material particularly if it is to be used with brass or aluminum or other relatively soft fittings. The adapter A may also be made of relatively hard material such as steel, which might be desirable in case it would be used with fittings in which nipple or the tube or sleeve are made up of hard material.

These and other modifications will be apparent to those skilled in the art without departing from the spirit of the invention as defined in the appended claims.

Having thus described the present invention so that others skilled in the art may be able to understand and practice the same, I state that what I desire to secure by Letters Patent is defined in what is claimed.

What is claimed is:

1. A fitting comprising an axially apertured body member, said member having a nipple having an internal outwardly flaring surface terminating in a generally radial edge, a fluid conducting member terminating in a portion having an internal outwardly flaring surface of steeper taper than said first-named flaring surface, an annular adapter member having two external tapered surfaces of different taper, the shallower tapered surface of the adapter making sealing engagement with the internal flaring surface of said nipple, the other tapered surface of said adapter extending to the periphery of the adapter and making sealing engagement with the internal tapered surface of said fluid conducting member, said adapter having a generally radial wall between the larger diameters of said tapers and facing the shallow taper, said wall being adapted for engaging with said generally radial edge of the nipple, and a nut to clamp the parts together, the major diameter of said shallower taper being less than that of said other taper.

2. An annular adapter of circumferentially continuous construction formed to permit the connection of dissimilar fittings, said adapter having two axially disposed tapered surfaces of different taper with their larger diameters adjacent one another, the steeper of said tapers extending to the periphery of said adapter, and a generally radial abutment wall formed on said adapter adjacent the larger diameter of one of said tapered surfaces and facing the shallower of said two tapered surfaces, the major diameter of said shallower taper being less than that of said other taper.

ROBERT W. PHILLIPS.

REFERENCES CITED

The following references are of record in the file of this patent:

UNITED STATES PATENTS

| Number | Name | Date |
|---|---|---|
| 502,665 | Friede | Aug. 1, 1893 |
| 538,634 | Witham | Apr. 30, 1895 |
| 2,328,469 | Laffly | Aug. 31, 1943 |
| 2,381,829 | Livers | Aug. 7, 1945 |

FOREIGN PATENTS

| Number | Country | Date |
|---|---|---|
| 394,354 | Great Britain | June 19, 1933 |